United States Patent
Forte et al.

(10) Patent No.: US 10,475,101 B1
(45) Date of Patent: Nov. 12, 2019

(54) DETERMINING POTENTIAL CAUSES OF AN ISSUE ASSOCIATED WITH RECOMMENDATIONS AND CHANGING RECOMMENDATION FILTER SETTINGS BASED ON THE OUTCOME OF AN ACTION

(71) Applicant: Amazon Technologies, Inc., Seattle, WA (US)

(72) Inventors: Gualtiero Forte, Bellevue, WA (US); Grant Michael Emery, Seattle, WA (US); Madhu Madhava Kurup, Bellevue, WA (US); Ram Prasad Venkatesan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 947 days.

(21) Appl. No.: 14/743,190

(22) Filed: Jun. 18, 2015

(51) Int. Cl.
*G06Q 30/06* (2012.01)

(52) U.S. Cl.
CPC .............................. *G06Q 30/0631* (2013.01)

(58) Field of Classification Search
CPC .................................................. G06Q 30/0631
See application file for complete search history.

(56) References Cited

U.S. PATENT DOCUMENTS

| 8,117,085 | B1* | 2/2012 | Smith | G06Q 30/0629 |
| | | | | 705/26.7 |
| 2004/0243604 | A1* | 12/2004 | Gross | G06Q 10/06 |
| 2013/0060730 | A1* | 3/2013 | Bailey, Jr. | G06F 11/3476 |
| | | | | 707/609 |
| 2015/0370798 | A1* | 12/2015 | Ju | G06F 17/30867 |
| | | | | 707/748 |
| 2016/0224444 | A1* | 8/2016 | Okada | G06F 11/2033 |

OTHER PUBLICATIONS

Shani, Guy, and Asela Gunawardana. "Evaluating recommendation systems." Recommender systems handbook. Springer, Boston, MA, 2011. 257-297. (Year: 2011).*

* cited by examiner

*Primary Examiner* — William J Allen
*Assistant Examiner* — Michelle T Kringen
(74) *Attorney, Agent, or Firm* — Kilpatrick Townsend & Stockton LLP

(57) ABSTRACT

Techniques for analyzing recommendations may be described. In particular, an item offered from a network-based resource may be selected based at least in part on past orders for the item. Recommended items offered from the network-based resource may also be identified. A determination may be made as to whether the recommended items may include the item. Based on this determination, an indication of an issue associated with recommending the item may be generated. Based on the indication, a workflow to identify a potential cause of the issue may be initiated.

20 Claims, 11 Drawing Sheets

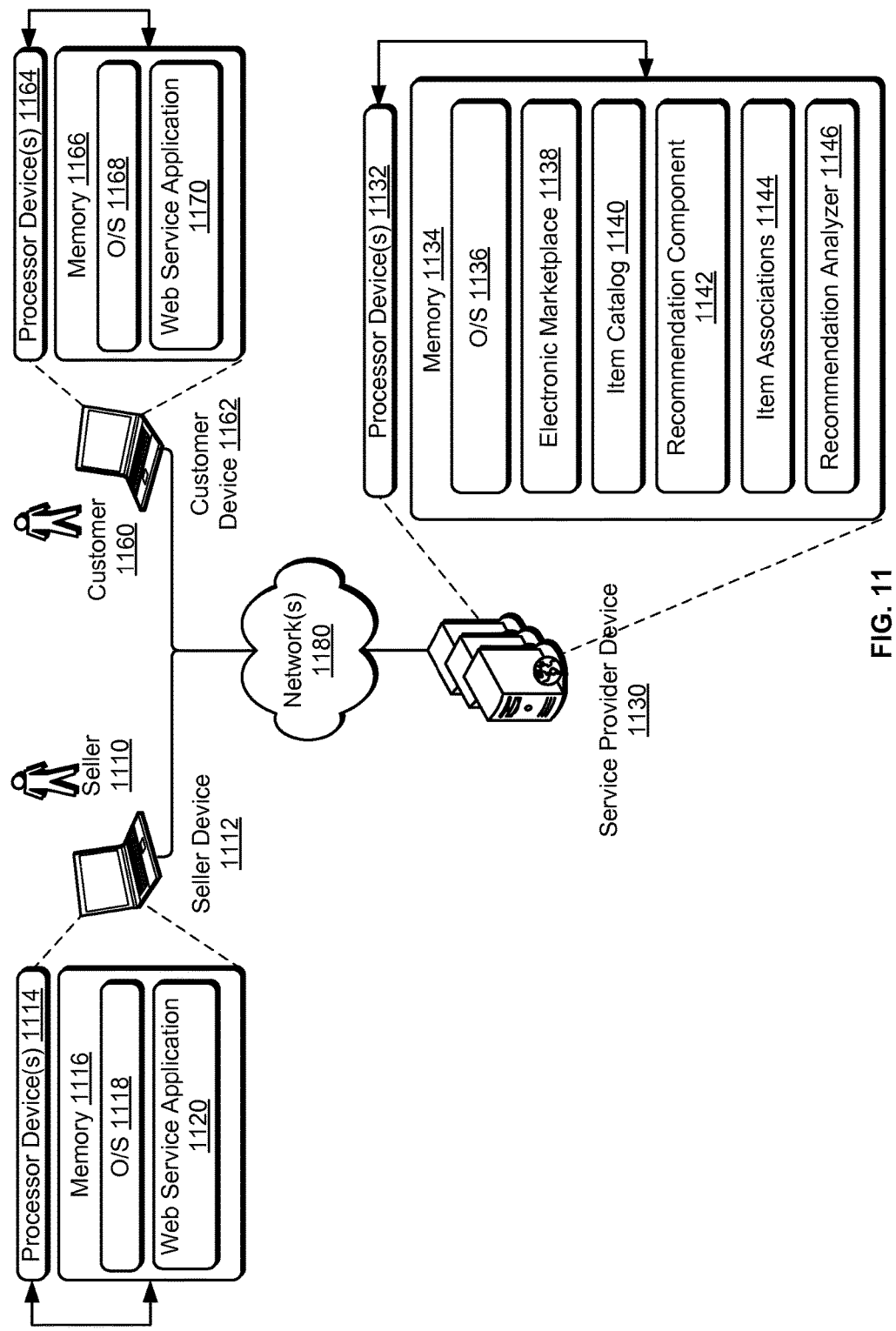

DETERMINING POTENTIAL CAUSES OF AN ISSUE ASSOCIATED WITH RECOMMENDATIONS AND CHANGING RECOMMENDATION FILTER SETTINGS BASED ON THE OUTCOME OF AN ACTION

BACKGROUND

More and more users are turning to network-based resources, such as web-based resources that may utilize the Internet, to purchase items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

Typically, a user may operate a computing device to access a network-based resource and search for an item. In response, the network-based resource may provide information about the item and provide recommendations for additional items. The user may accordingly review and order some of the recommended items.

BRIEF DESCRIPTION OF THE DRAWINGS

Various embodiments in accordance with the present disclosure will be described with reference to the drawings, in which:

FIG. 11 illustrates an example architecture for providing a network-based resource, including at least one user device and/or one or more service provider devices connected via one or more networks, according to embodiments.

DETAILED DESCRIPTION

Figure 1:
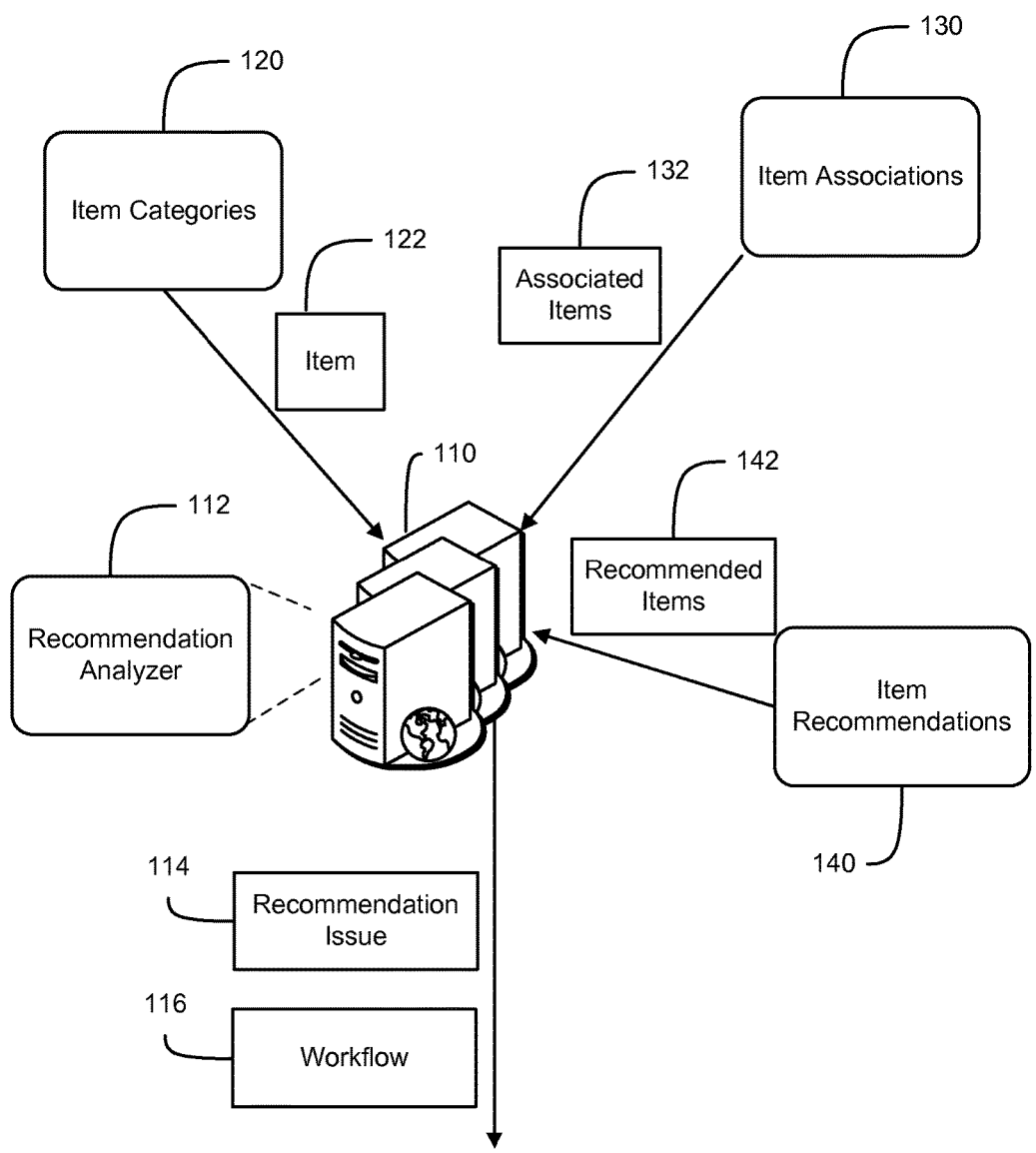
FIG. 1 illustrates an example environment for detecting an issue associated with recommending an item, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, analyzing recommendations. In particular, information about items may be available from a network-based resource (e.g., a web site). Upon a request for information about an item, a recommendation for one or more other items may be provided by a recommendation service. Certain recommendations may erroneously exclude or include information about particular items. Such errors may be analyzed to determine one or more potential causes for the errors. Addressing the potential causes may reduce the number of errors and, generally, improve the quality of the recommendations. In an example, an item of interest may be selected. The item may be expected to be recommended frequently or, alternatively, infrequently. Recommendations associated with the item may be analyzed to determine how frequently the recommendations service recommends the item. If the expected and determined frequencies differ unacceptably, an issue associated with recommending the item may be detected. The detection may initiate an analysis workflow. The workflow may methodically analyze different components involved in recommending the item to identify a potential cause. Over time, data associated with potential causes may be collected. A component more frequently identified as a potential cause may be assigned a higher priority relative to another component. High priority components may be troubleshot to resolve the associated issues.

To illustrate, consider an example of an electronic marketplace. The electronic marketplace may represent an electronic platform configured to facilitate interactions between computing devices of users. For instance, sellers may operate computing devices to access the electronic marketplace and list items and associated offers. Customers may operate computing devices to access the electronic marketplace and order or purchase offered items. A data store associated with the electronic marketplace may maintain associations between the items. An association between two items may be generated based on past orders and may indicate that the two items may be frequently ordered together. A recommendation engine associated with the electronic marketplace may recommend items based on the associations. For example, if a search for one of the two items is received, a recommendation for the other item may be made. In certain situations, it may be expected that a popular item (e.g., a popular fiction book) may be identified in a number of recommendations (e.g., in response to a purchase of other fiction books). That may be because of, for instance, the item's popularity. However, such an item may be erroneously removed from the recommendations because of a filter setting of the recommendation engine. To detect and resolve this issue, a recommendation analyzer may be implemented. This analyzer may access the data store to retrieve a list of items associated with the item (e.g., a list of the other fiction books). The list may represent items that, when individually or collectively ordered, may result in recommendations that identify the popular item (e.g., the popular fiction book) based on the associations. The computing quality service may input the list to the recommendation engine and, in response, receive identifiers of recommended items. If the popular item is absent from the recommended items, a recommendation issue may be detected. In turn, the computing quality service may execute a workflow that may check, in sequence or in parallel, outputs of the various filters of the recommendation engine in response to the list of items. A particular filter excluding the popular item from outputted recommendations may be flagged as a potential cause of the recommendation issue.

In the interest of clarity of explanation, the embodiments may be described herein in the context of recommending items available from a network-based resource, such as a web site associated with an electronic marketplace. However, the embodiments are not limited as such. Instead, the embodiments may similarly apply to items available from same or different sources. Further, an item may represent a tangible item (e.g., a camera, a digital audio record) or an intangible item (e.g., a service, information about an item).

Turning to FIG. 1, a computing environment for analyzing recommendations is illustrated. In particular, a recommendation analyzer 112 hosted on a computer system 110 may be configured to analyze recommendations, identify recommendation issues, and execute workflows to identify potential causes of the issues. The recommendations may be provided from one or more sources storing or generating items recommendations 140. The recommendation analyzer 112 may analyze the recommendations based on information also available from one or more sources, such as sources that maintain item associations 130. The various sources may be associated with a network-based resource (e.g., a web site), such as one implemented in connection with an electronic marketplace. Further, the analysis may be performed for a number of items. In an example, items meeting particular criteria may be selected from a plurality of item categories 120 and the analysis may be performed for these items.

In an embodiment, a data store may maintain information about items. The data store may be hosted by or accessible to the computer system 110. The information may be organized in the item categories 120. An item category may represent a category of items that may include a plurality of items having one or more common features, such as a books category, and a fiction books sub-category. Further an item category may correspond to a browse node of the network-based resource offering the items. The browse node may correspond to a node in a hierarchy used to present information at an interface associated with the network-based resource. For each of the item categories 120, the information may describe various aspects of the respective items. For example, the information may describe features of the items, may track popularities, revenues, ordered quantities, reviews, ratings, promotions of the items, and/or other information associated with the item or offering the item via the network-based resource.

A same or a different data store, also hosted by or accessible to the computer system 110, may maintain information about the item associations 130. An item association may represent an association, such as a relationship, between two or more items. Generally, the item association may be generated based on historical data associated with offering the two or more items. Various types of associations may be generated based on the historical data. For example, an "ordered together" association may represent a relationship that two or more items may be ordered together at a frequency that may exceed a threshold. To illustrate, if two books are frequently ordered together, such as more than fifty percent of the time (or some other threshold), an "ordered together" association may exist between the two books. This type of association may be generated from past joint orders of the two or more items. In another example, a "viewed together" association may represent a relationship that two or more items may be viewed together in same computing sessions at a frequency that may exceed a threshold. To illustrate, if information about two books is frequently requested together (e.g., the books viewed together), such as more than fifty percent of the time (or some other threshold), a "viewed together" association may exist between the two books. This type of association may be generated from click streams of users browsing the items offered from the network-based resource. In yet another example, an "available together" association may represent a relationship that two or more items may be available for ordering together (e.g., in a bundle). To illustrate, if two books are offered in a bundle, an "available together" association may exist between the two books. This type of association may be generated from seller and/or service provider-defined offers for the items.

In an embodiment, the item recommendations 140 may be generated by a recommendation component (e.g., a computing service) that is hosted by or accessible to the computer system 110 and that may be configured to generate recommendations. This component may represent a recommendation engine, a recommendation service, a recommender system, and/or any recommendation or filtering system. The recommendation component may be configured to generate recommendations specific to items and/or users or independently of such items and users. In an example, a recommendation may be generated in response to a received identifier of an item and may include other identifiers of recommended items. The recommendation component may generate the recommendation by identifying candidate items based on the item associations 130 and the item categories 120 and by filtering the candidate items based on one or more filters of the recommendation component.

The recommendation analyzer 112 may implement various techniques to analyze the recommendations, as further illustrated in the next figures. Generally, the recommendation analyzer 112 may select an item 122 from one of the item categories 120. The selection may be based on one or more criteria, such as past orders received at the network-based resource for the item exceeding or falling below a certain threshold. This criterion may indicate popularity, revenue, ordered quantity, review, rating, and/or promotion of the item. Based on the selected item, the recommendation analyzer 112 may further access a list of associated items 132 from the item associations 130 and a list of recommended items 142 from the item recommendations 140. The recommendation analyzer 112 may analyze one or both lists to identify a recommendation issue 114 and execute a workflow 116.

The recommendation issue 114 may represent an issue with recommending the item because of one or more potential causes. A potential cause may relate to the different components, whether implemented in hardware or software, involved in generating recommendations. For example, the potential cause may include any or a combination of the recommendation component, the computing resource hosting the recommendation component, filter settings of the recommendation component, incorrect or inaccurate item associations, insufficient amount of historical data to generate particular item associations, incorrect or improper information (e.g., description) about particular items, and/or other hardware and software bugs. The workflow 116 may represent a number of actions, such as checks, that may be performed to identify the potential cause of the recommendation issue 114.

To illustrate, consider an example of an "inverse order similarity" analysis. In this example, the recommendation analyzer 112 may select a most popular fiction book (as the item 122) from a category of fiction books (as one of the item categories 120). The item associations 130 may store relationships indicating what other items, such as books and related accessories, may have been ordered together with the popular fiction book. Based on the relationships, a list of items (as the associated items 132) may be identified. In particular, each item in the list may or should result in a recommendation for the popular fiction book. Items on this list may be referred to herein as having an inverse order similarity to the popular fiction book. An example of determining such similarities is further illustrated in FIG. 3. The recommendation analyzer 112 may input the list to the recommendation component and may, in response, receive recommendations (as the recommended items 142). The recommendation analyzer 112 may analyze the recommendations to determine whether the recommendations identify the popular fiction book. If the popular fiction book is excluded from the recommendations, the recommendation analyzer may generate a flag indicating that a recommendation issue (as the recommendation issue 114) may exist. Further, the recommendation analyzer 112 may sequentially check the filters of the recommendation component. In this check, the recommendation analyzer 112 may input the list of the items to each filtering state of the recommendation component and receive respective recommendations. A filtering stage that may filter out the popular fiction book may be identified as the potential cause of the recommendation issue.

In the interest of clarity of explanation, the embodiments may be described herein using an example of analyzing recommendations associated with a popular item based on "ordered together" associations. However, the embodiments are not limited as such. Instead, the embodiments may similar apply to other types of items and/or to other types of associations. For example, an item meeting a criterion may be selected for a recommendation analysis. That criterion may indicate that the item may have a certain (high or low) popularity, revenue, ordered quantity, review, rating, and/or promotion. Similarly, a particular type of associations may be selected for the recommendation analysis, such as "ordered together," "viewed together," "available together," or other available associations.

Figure 2:
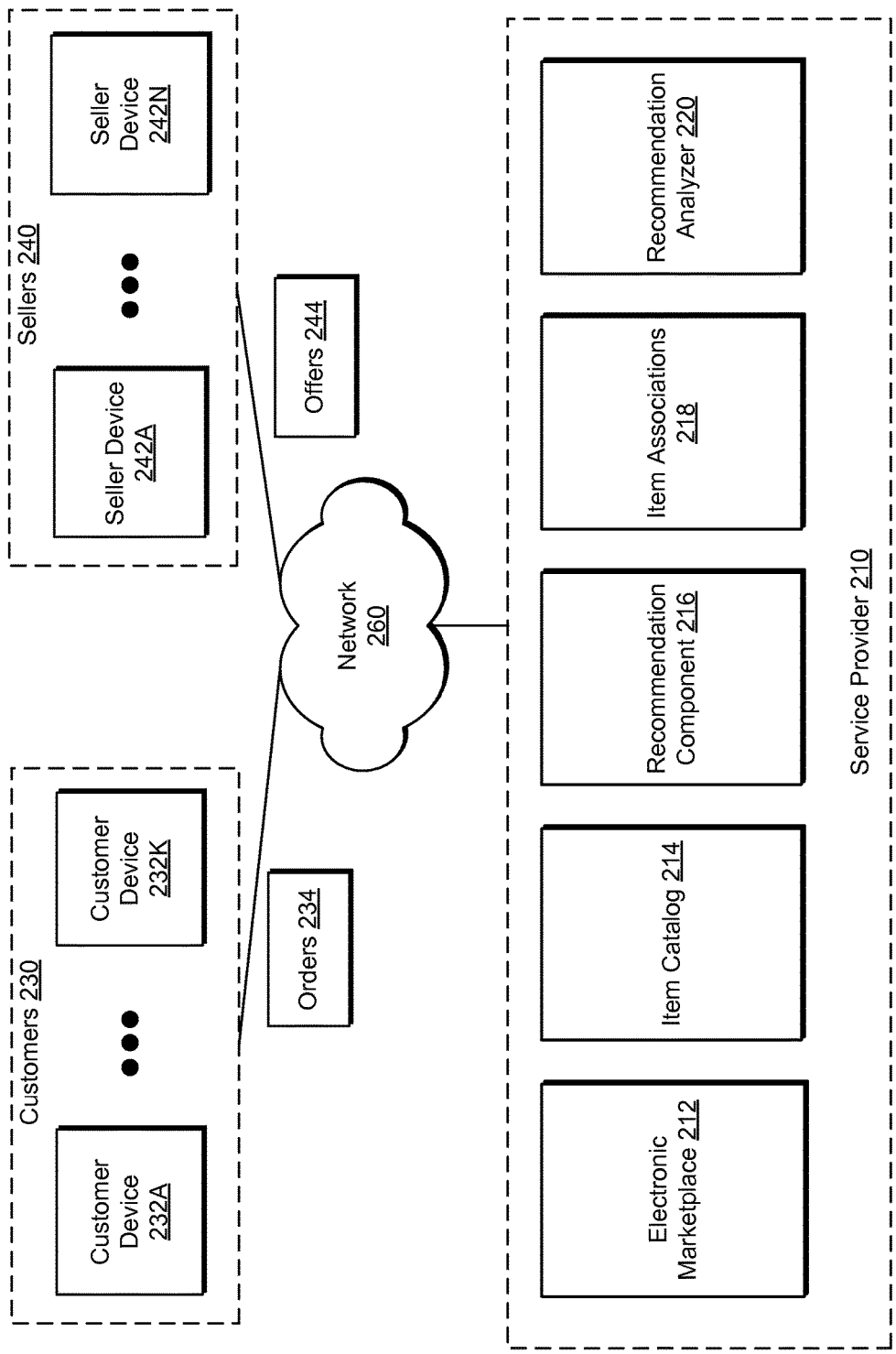
FIG. 2 illustrates an example computing environment associated with an electronic marketplace offering items, according to embodiments.

A recommendation analyzer may be implemented to analyze recommendations provided to users from a network-based resource. The network-based resource may be implemented as a part of an electronic marketplace offering items to the users. FIG. 2 illustrates an example environment of an electronic marketplace.

In particular, a service provider 210 of an electronic marketplace 212 may implement a recommendation analyzer 220, similar to the recommendation analyzer 112, on a computing system. The recommendation analyzer 220 may be configured to analyze recommendations of items offered from the electronic marketplace 212, identify recommendation issues, and execute workflows to identify potential causes of the recommendation issues.

In an embodiment, the electronic marketplace 212 may provide a network-based resource, such as a web site, to access information about the offered items. The electronic marketplace 212 may also provide an electronic platform to offer the items and to maintain information about the items and the offers. For example, the offered items may be cataloged in an item catalog 214. The item catalog 214 may represent a data structure describing the information about the items. An item may be associated with one or more pages of the item catalog 214, where the page(s) may describe attributes of the item, the offer, and other information associated with offering the item at the electronic marketplace 212.

A network-based document (e.g., a web page, a detail page, etc.) of the electronic marketplace 212 may be associated with an item. The network-based document may use information from the item catalog 214. In an example, the network-based document may allow sellers 240 and/or the service provider 210 to define offers of items. For instance, the sellers 240 may list offers 244. The provided information may be added to the item catalog 214. The network-based document may also allow customers 230 to review the information available from the item catalog 214 (e.g., offers of items) and make order or purchase decisions. The customers 230 may, for example, place orders 234 or view information about different items.

In response to a customer ordering an item (or a request for information about the item), a recommendation component 216 associated with the electronic marketplace 212 may be configured to recommend additional items to the customer. Information about the recommendation and the additional items may be presented in, for example, a widget of a network-based document. The recommendation component 216 may generate the recommendation based on item associations 218. These associations may maintain relationships indicating frequent joint orders for items (e.g., items ordered together). For example, if the ordered item and the additional item have been ordered together at a frequency that exceeds a threshold, the additional item may be included in the recommendation.

The recommendation analyzer 220 may be configured to analyze recommendations generated by the recommendation component 216. The analysis may take into consideration the item associations 218. For example, the analysis may identify discrepancies between the recommendations of the recommendation component 316 and expected recommendations based on the item associations 218. Further, the recommendation analyzer 220 may execute a workflow to identify potential causes based on the discrepancies. In an example, a workflow may consider a type and a frequency of occurrence of a discrepancy.

As such, the service provider 210 may operate the electronic marketplace 212 to facilitate interactions between the service provider 210, the customers 230, and the sellers 240 over a network 260. Each one of the sellers 240 may operate one or more seller devices 242A-N to access the electronic marketplace 212 and perform various seller-related functions. A customer may be an item recipient, a buyer, or any user reviewing, browsing, ordering, obtaining, purchasing, or returning an item of a seller. Each one of the customers 230 may operate one or more customer devices 232A-K to access the electronic marketplace 212 and perform various customer-related functions. By implementing the recommendation analyzer 220, the service provider 210 may automatically analyze recommendations, detect potential issues, and identify potential causes. If such causes are addressed, the quality of the recommendations may be improved.

In addition to an electronic marketplace, the embodiments described herein may similarly apply to other types of marketplace. For example, a brick and mortar store of a merchant (or chain of such stores) may use an electronic platform (e.g., a web service) to manage an inventory of merchant-offered items and associated recommendations. Recommended items may be given certain placements, labeling, and/or pricing within the store. Flyers and advertisements (online or hardcopies) may be generated and distributed to identify recommended items. In many situations, the use of the electronic platform may be beneficial or at least desired. For example, given the scale of the store (e.g., the large number of offered items or the number of stores within a chain) and/or the frequency of recommendation updates (e.g., special deals on a weekly basis), operators of the store may turn to a management system hosted on the electronic platform to generate recommendations of items. In turn, the management system may host a recommendation analyzer to analyze potential issues and causes associated with the recommendations. In this way, the recommendation analyzer may be used to check and improve the quality of the recommendations. In particular, the management system may be integrated or interface with various point of sale devices within a store, inventory tracking mechanisms, customer loyalty programs, user interfaces for store operators, and/or advertisement mechanisms. As such, the management system may access historical data about recommended, sold, and/or returned items for the different customers, promotions, and/or seasonal items, and may output recommendations applicable to a next period of time (e.g., the next week). Based on this data, the recommendation analyzer of the management system may analyze the quality of the recommendations. If recommendation issues and potential causes are detected, adjustments to the management system may be performed to improve the quality.

Recommendations may be analyzed based on available item associations. In particular, a recommendation component may use the item associations to generate a recommendation. When analyzing the recommendation, the analysis may account for the item associations. Doing so may facilitate an efficient identification of a recommendation issue. For example, the item associations may result in an expected recommendation. If a discrepancy exists between the expected recommendation and the generated recommendation of the recommendation component, the recommendation issue may be detected. Further, the item associations may themselves be the potential cause.

Figure 3:
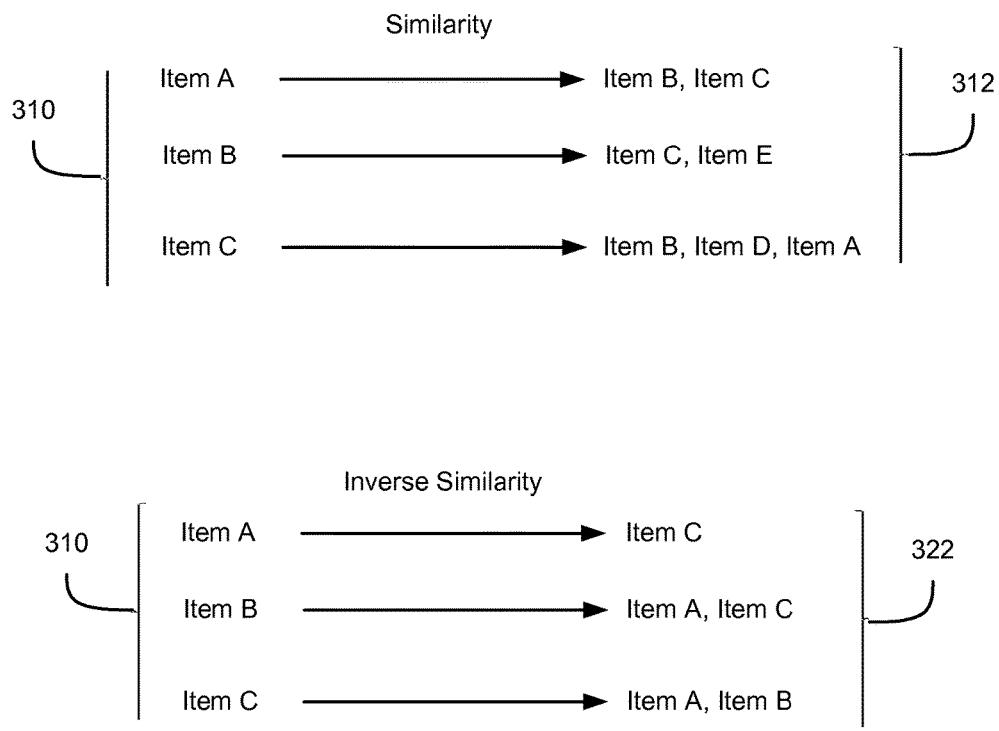
FIG. 3 illustrates an example of associations between items, according to embodiments.

Turning to FIG. 3, an example of item associations is illustrated. In particular, similarity and inverse similarity are illustrated. The similarity may be defined based on the type of an association. For example, for an "ordered together" association, a similarity may be based on joint orders. Accordingly, two items may be similar if the two items may be frequently ordered together. Further, a degree of similarity may be defined based on a frequency of the joint orders. For example, the higher the frequency of the two items being ordered together, the higher the degree of similarity may be. The similarity may be used to recommend an item. For example, if one of the two items is ordered, the remaining item may be recommended because of the similarity. This remaining item may be recommended over other similar items based on having a higher degree of similarity.

An inverse similarity may correspond to the inverse direction of a similarity. In other words, an item may be inversely similar to another item if the other item is similar to the item. For example, the item may be recommended based on the other item being ordered (rather than the other item being recommended if the item is ordered). The inverse similarity may be derived from the joint orders or from the similarity itself. For example, by determining that one item may be similar to another item, the inverse direction may be followed to determine that the other item may be inversely similar to the one item. Further, as in the case of the similarity, a degree for the inverse similarity may be derived from the frequency of joint orders.

As illustrated, some of items 312 may be similar to some of items 310. For example, items B and C may be similar to item A. This may indicate that, when item A is viewed or ordered, items B and/or C may be recommended. Likewise, items C and E may be similar to item B; and items B, D, and A may be similar to item C.

Based on these similarities, the inverse similarities of the items 310 may be established and added to a list 322. For example, the inverse similarity of item A may be item C because item A may be recommended when item C is viewed or ordered as indicated by the above similarities. Likewise, the inverse similarity of item B may be items A and C; and the inverse similarity of item C may be items A and B.

To illustrate, consider an example of a book titled "raising a family." When viewing this book, another book titled "being a good spouse" may be recommended. In this case, the book "being a good spouse" may be similar to the book "raising a family." Further, when viewing the book "being a good spouse," the book "raising a family" may not be recommended. Instead, the book "raising a family" may be recommended when books titled "raising a boy" and "raising a girl" may be viewed. As such, the book "being a good spouse" may not be inversely similar to the book "raising a family," but each of the books "raising a boy" and "raising a girl" may be.

Once a recommendation issue may have been detected, a recommendation analyzer may initiate a workflow to determine a potential cause of the issue. Generally a workflow may represent a set of actions, such as checks, that may be performed based on the recommendation issue. Some or all of the actions may be predefined and may be specific to respective potential causes. When actions specific to a potential cause are performed, an outcome of performing the actions may be tracked and/or analyzed and, accordingly, the potential cause may be determined as the one causing the recommendation issue. Thus, upon execution of the workflow, the recommendation analyzer may identify the culprit cause(s).

Figure 4:
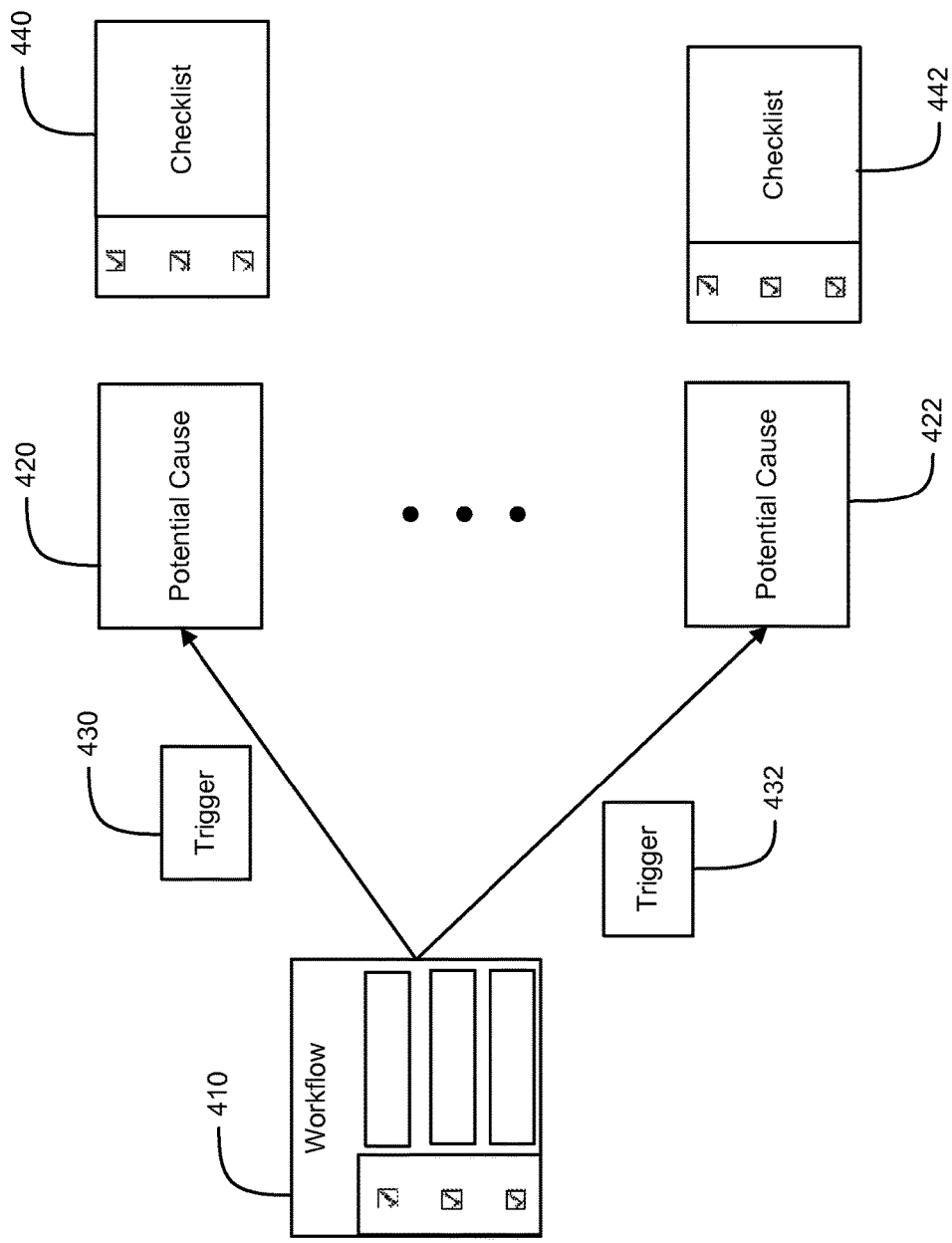
FIG. 4 illustrates an example workflow to identify a potential cause of a recommendation issue, according to embodiments.

Turning to FIG. 4, the figure illustrates using an example workflow 410 to identify the culprit cause(s). In particular, there may be a number of potential causes, illustrated as potential cause 420 and potential cause 422 (although two are illustrated, there may be a higher or lower number of potential causes). Each of the potential causes may be associated with a set of actions that, when performed, may allow the recommendation analyzer to determine which potential cause(s) may be behind the recommendation issue. For example, the potential causes 420 and 422 may be associated with the set of actions 440 and 442, respectively. Each set of actions may be specific to the potential causes such that to test for certain features of the potential cause. For example, each set of actions may be maintained as a checklist listing the features of the respective potential cause and the test(s) to be performed against the features.

In an example, the recommendation analyzer may execute the workflow 410 and check the various potential causes in sequence or in parallel. In another example, the execution of the workflow 410 may be selective. In particular, based on a trigger, the recommendation analyzer may check a particular potential cause. A trigger may be based on the recommendation issue, such as on type and/or frequency of discrepancy associated with the recommendation issue. As such, a trigger 430 may cause a check of the potential cause 420, whereas another trigger 432 may cause a check of the other potential cause 422.

To illustrate, consider an example of two potential causes: a computing resource hosting a recommendation engine as one potential cause, and a filter setting of the recommendation engine as another potential cause. If a recommendation issue is detected infrequently, that infrequency may trigger a check of the computing resource. That may be because the recommendation issue may be transient indicating a potential, infrequent hardware or network failure. In this case, the workflow 410 (or the performed actions) may test the computing resource. For example, upon execution of the workflow 410, the recommendation analyzer may determine an operational status of the computing resource. If the operational status indicates a failure of the computing resource, the recommendation analyzer may flag the computing resource as the cause of the recommendation issue. In another example, the recommendation analyzer may replicate the recommendation on another computing resource hosting another instance of the recommendation engine. In this example, if the replicated recommendation lacks the recommendation issue, the recommendation analyzer may flag the computing resource as the cause of the recommendation issue.

On the other hand, if the recommendation issue is detected very frequently, that frequency may trigger a check of the filter setting. That may be because the recommendation issue may be constantly (or at a high rate) observed indicating a potential, recurring filtering out scenario. In this case, the workflow 410 (or the performed actions) may test the filter setting. For example, upon execution of the workflow 410, the recommendation analyzer may change the filter setting of the recommendation engine (e.g., via an application programming interface (API) call or other mechanism) and replicate the recommendation. If the replicated recommendation lacks the recommendation issue, the recommendation analyzer may flag the filter setting as the cause of the recommendation issue.

Figure 5:
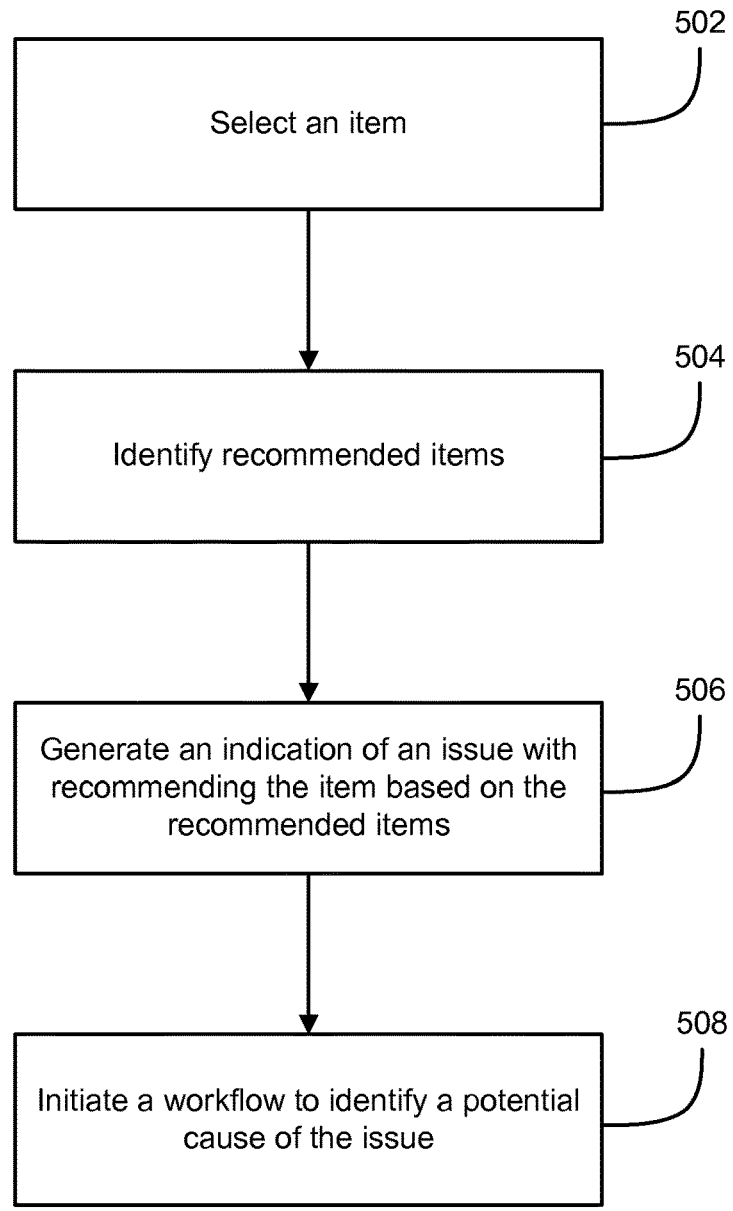
FIG. 5 illustrates an example flow for detecting a recommendation issue and a potential cause, according to embodiments.
Figure 8:
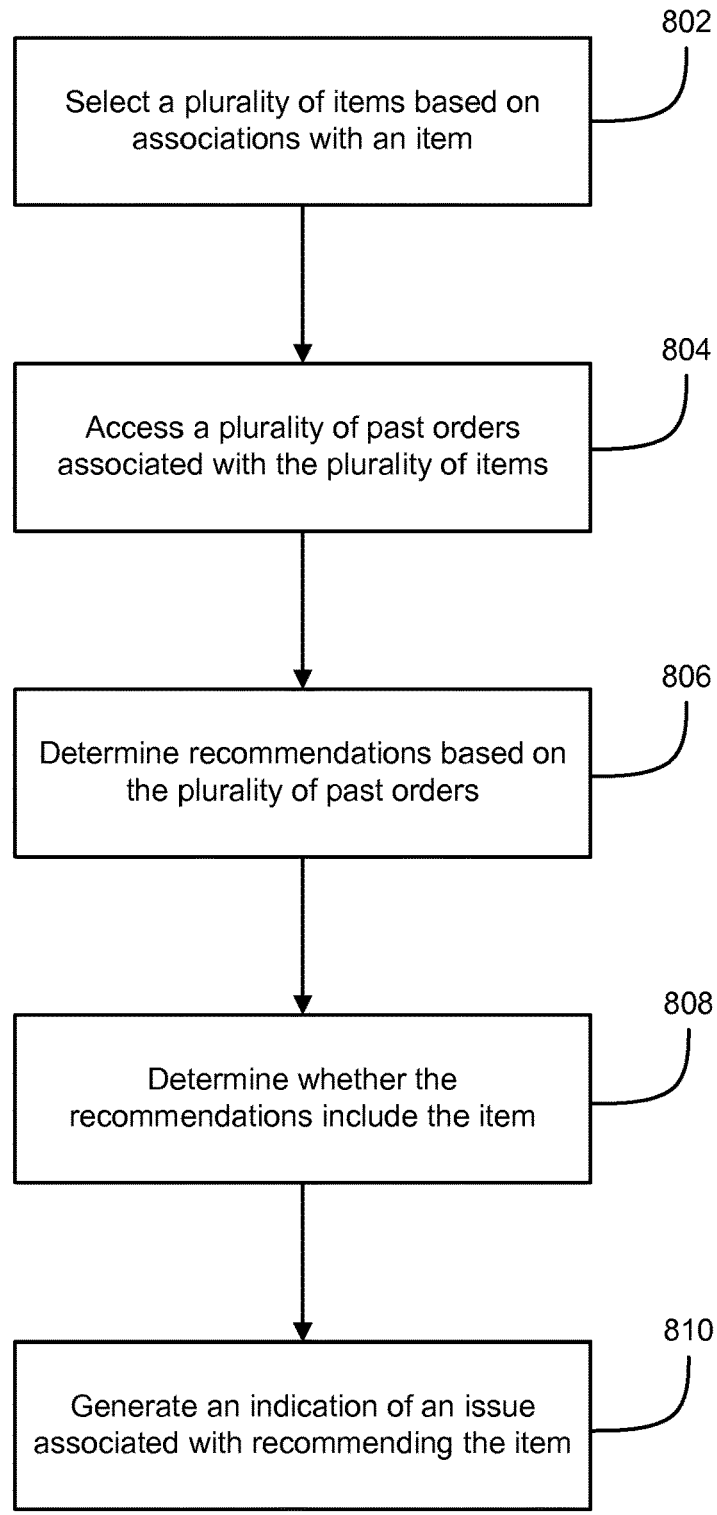
FIG. 8 illustrates another example flow for detecting a recommendation issue, according to embodiments.
Figure 9:
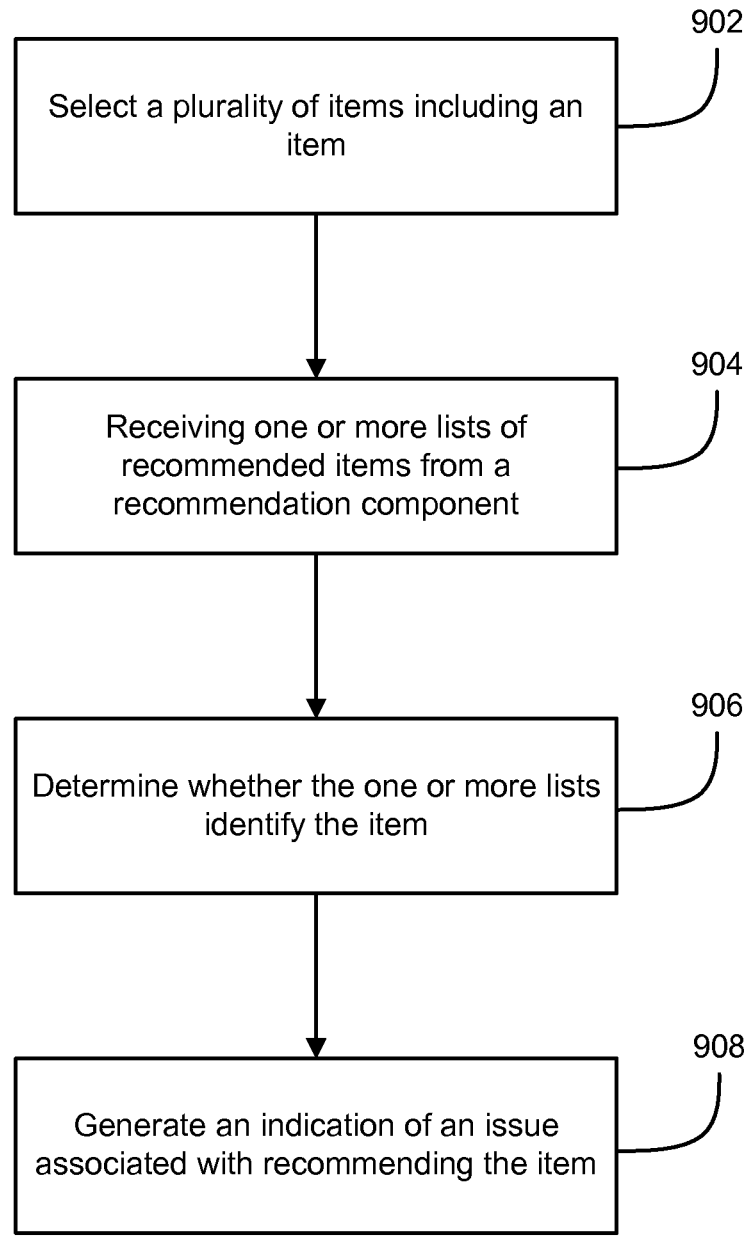
FIG. 9 illustrates another example flow for detecting a recommendation issue, according to embodiments.
Figure 10:
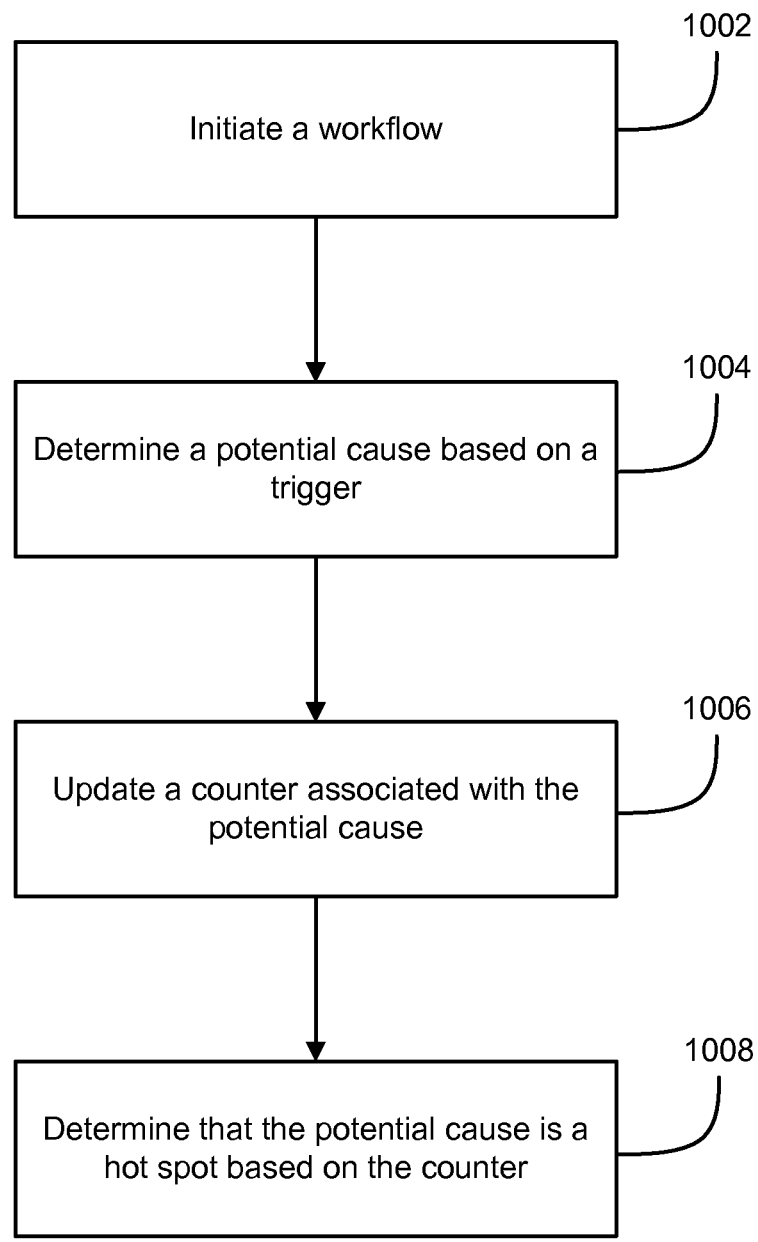
FIG. 10 illustrates an example flow for executing a workflow to identify a potential cause of a recommendation issue, according to embodiments.

Turning to FIGS. 5-10, the figures illustrate example flows for analyzing recommendations. In particular, FIG. 5 illustrates an example flow for determining a recommendation issue and a potential cause of this issue. In comparison, FIGS. 6-9 illustrate different example flows for determining a recommendation issue. FIG. 10 illustrates an example flow for determining a potential cause. Some operations across the example flows may be similar. Such similarities are not repeated herein in the interest of clarity of explanation.

In the illustrative operations, some of the operations or functions may be embodied in, and fully or partially automated by, components executed by one or more processors. For example, a recommendation analyzer, such as the recommendation analyzer 112, hosted on a computing resource of a service provider may be configured to perform some or all of the operations. Nevertheless, other, or a combination of other, computing resources and components may be additionally or alternatively used. Also, while the operations are illustrated in a particular order, it should be understood that no particular order is necessary and that one or more operations may be omitted, skipped, and/or reordered.

In the interest of clarity of explanation, the example flows of FIG. 5-10 illustrate an analysis of a recommendation issue and a potential cause. Nevertheless, the embodiments described herein are not limited as such. Instead, the embodiments may similarly apply to a higher number of recommendation issues and/or of potential causes.

Turning to FIG. 5, the example flow may start at operation 502, where an item may be selected. In this way, rather than analyzing all items in an item category (which may be in the thousands), the analysis may be limited to certain items. This may reduce the resource usage by considering only items that may be of interest.

In an example, the item may be selected from an item category based on one or more criteria such as past orders for the item. The number of past orders may be compared to a threshold. The comparison may indicate popularity, revenue, ordered quantity, review, rating, and/or promotion of the item.

The number exceeding the threshold may indicate that the item may be popular (or more popular relative to another item associated with a lower number of past orders or a number below the threshold). Similarly, exceeding the threshold may indicate a high (or a higher relative to the other item) revenue, ordered quantity, review, rating, and/or promotion. In example, the selected item may be one of the most popular items (or any of the other types (e.g., revenue) of items). In comparison, the number of past orders falling below the threshold (or some other lower threshold) may indicate that the item may be unpopular, provide low revenue, not ordered often, have a few reviews, have a low rating, and/or not being promoted aggressively.

In the interest of clarity of explanation, the example flows of FIGS. 5-10 are illustrated using an example of a most popular item. However, the example flows similarly apply to the other types of items. For example, for the most popular item, an analysis implemented by the example flows may check to see if recommendations exclude this item at an unacceptable rate (e.g., higher than a predefined threshold). Similarly, for a least popular item, the analysis may check to see if the recommendations include this item at also an unacceptable rate (e.g., higher than a same or different threshold).

At operation 504, recommended items may be identified. FIGS. 6-9 illustrate various example flows for identifying recommended items. Generally, such items may be identified based on item recommendations generated by a recommendation engine and/or based on item associations maintained at a data store.

At operation 506, an indication of an issue with recommending the selected item may be generated based on the recommended items. FIGS. 6-9 illustrate various example flows for detecting recommendation issues. Generally, if the recommended items exclude the selected item at a frequency higher than a threshold, that exclusion frequency may trigger the indication. For example, if the selected item is the most popular item within the item category, it may be expected that the item would be recommended frequently. However, when the selected item is absent (e.g., not identified) in a list of the recommended items, or if identified a number of times less than expected, that expectation may not have been met. Accordingly, the indication of the recommendation issue may be generated.

At operation 508, a workflow may be initiated to identify a potential cause of the issue. When executed, the workflow may check, in sequence, in parallel, or selectively, a number of potential causes and identify one or more culprit causes. FIG. 10 illustrates an example flow for identifying the culprit cause(s).

Figure 6:
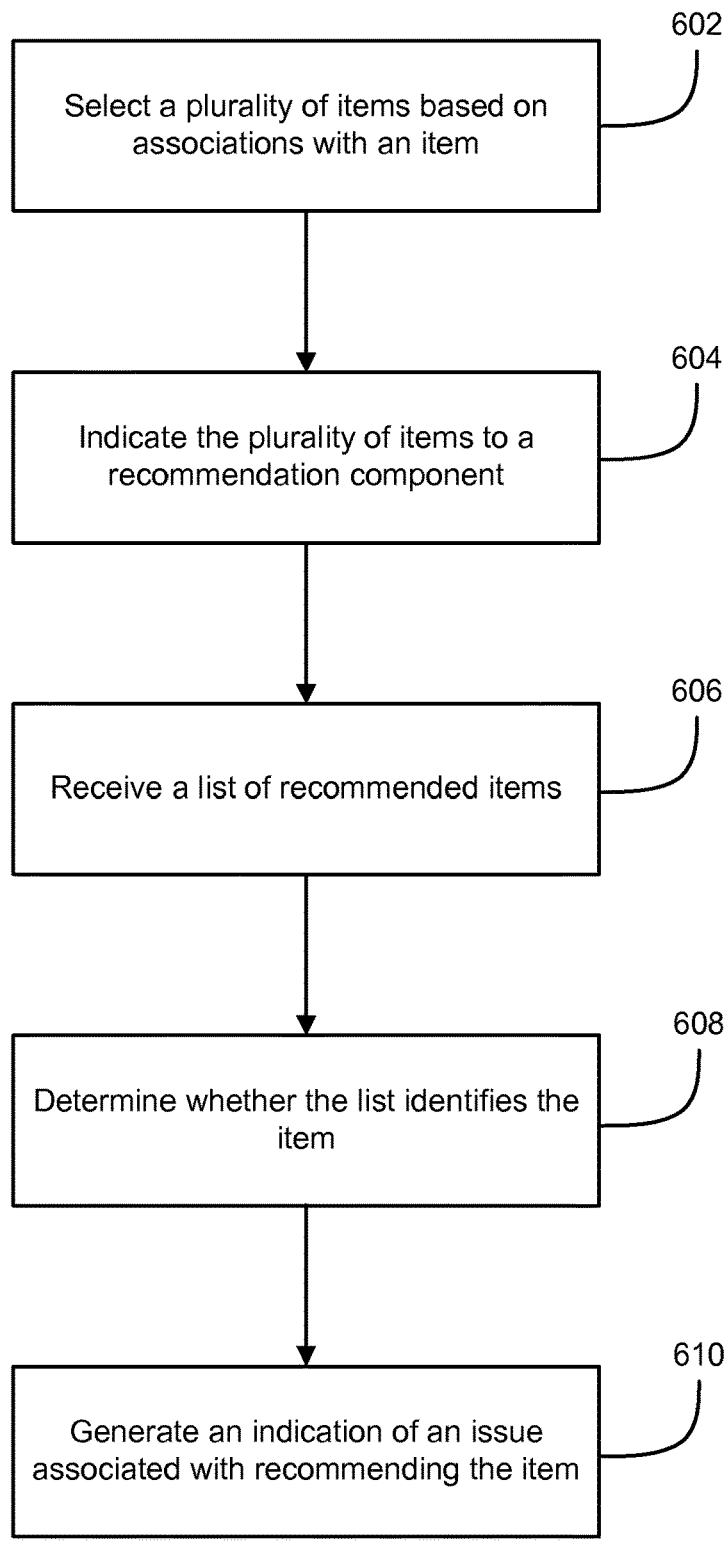
FIG. 6 illustrates an example flow for detecting a recommendation issue, according to embodiments.

Turning to FIG. 6, the figure illustrates an example flow for determining a recommendation issue. In particular, the example flow may start at operation 602, where a plurality of items may be selected based on associations with an item. For example, the item may have been selected as a most popular item from an item category. Accordingly, a data store storing item associations, such as "ordered together" associations, may be accessed to retrieve a list (or identifiers) of the plurality of items. The plurality of items may be inversely similar to the item. As such, each item identified in the list may represent an inversely similar item that, when viewed or ordered, would result in a recommendation for the most popular item.

In an example, if the list is blank or contains a number of items below a threshold (e.g., less than expected), that situation may be sufficient to generate an indication of a recommendation issue and a potential cause. In particular, in this situation the potential cause may be the lack of a sufficient number of associated items. That may be the case when, for instance, the item may have been newly offered (rather than being the most popular item).

At operation 604, the plurality of items may be indicated (e.g., identified) to a recommendation component, such as a recommendation engine. For example, the list of the plurality of items may be inputted to the recommendation component. In particular, an API call may be made to provide identifiers of the plurality of items and, in turn, receive a list of recommended items.

Furthermore, prior to or as a part of the indicating, the plurality of items may be ranked based on, for example, respective degrees of similarity. The top fifty (or some other preset number) of ranked items may be indicated to the recommendation component along with the degrees of similarity. In this way, resource usage committed to analyzing a recommendation may be reduced.

At operation 606, a list of recommended items may be received from the recommendation component. This list may be received in response to identifying the plurality of items to the recommendation component. For example, the recommendation component may in turn access the data store and generate the list of recommended items based on the identified items and based on the item associations available from the data store. The generated recommendations may be based on the degrees of similarities.

At operation 608, a determination may be made whether the received list identifies the item (e.g., the most popular item) or not. For example, the received recommendations may be parsed. The number of times (e.g., frequency of occurrence) the item is identified in the recommendations may be tracked (e.g., the number of times the item may have been recommended in response to the identified plurality of items). If the number falls below a predefined threshold (e.g., the item is absent from all of the recommendation, or some other occurrence frequency), a recommendation issue may exist. Thus, if on one hand, the item is expected to be recommended frequently based on the item's popularity and, on the other hand, the item may not be in fact recommended as frequently, a discrepancy may arise indicating the existence of the recommendation issue.

At operation 610, an indication of the recommendation issue may be generated based on the item being excluded from the list of recommended items at an unacceptable rate. In an example, the indication may include information about the unacceptable rate (e.g., the number of times the item is not recommended). That information may be used as a selective trigger of certain actions of a workflow.

Figure 7:
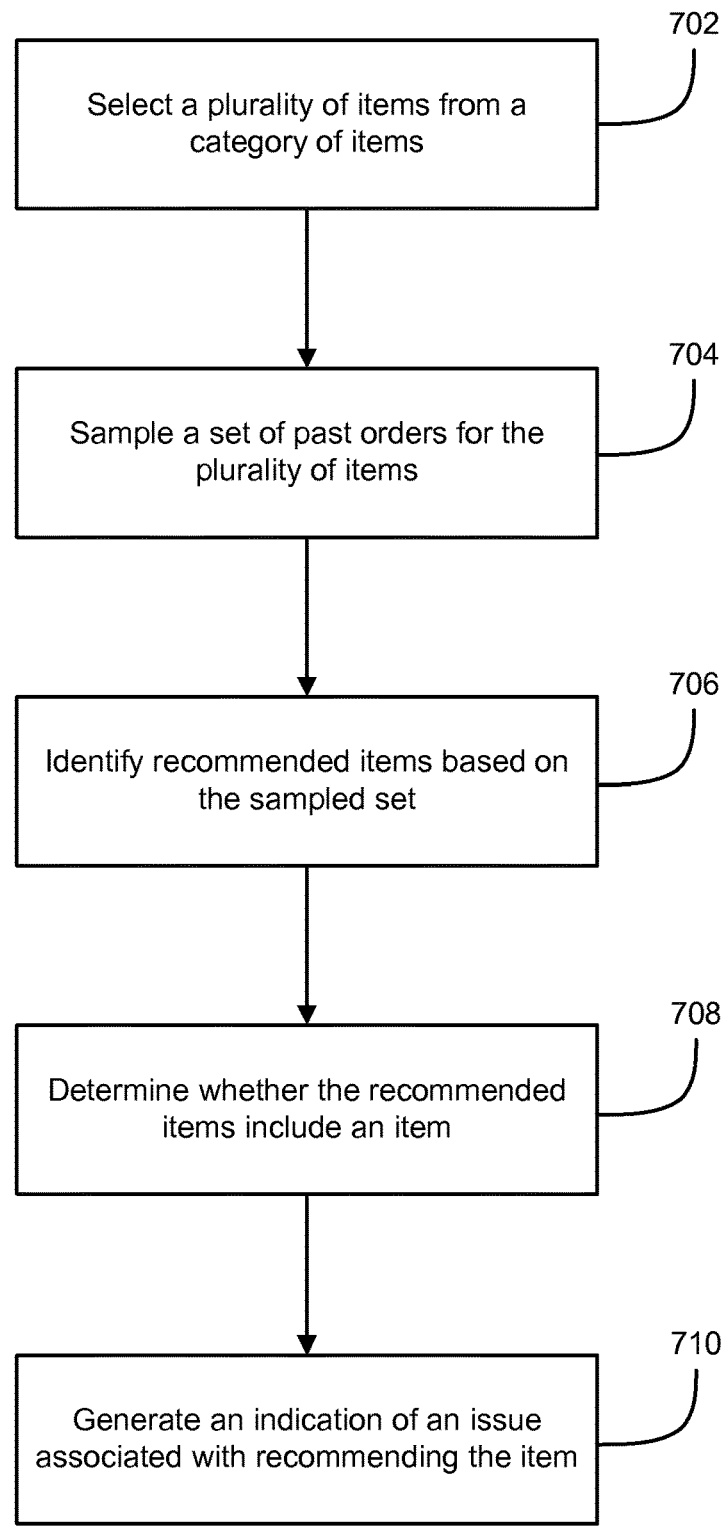
FIG. 7 illustrates another example flow for detecting a recommendation issue, according to embodiments.

Turning to FIG. 7, the figure illustrates another example flow for determining a recommendation issue. In particular, the example flow may use similarities, rather than inverse similarities, accessible from a data store. Further, example flow may not involve exchanging information with a recommendation component.

The example flow may start at operation 702, where a plurality of items may be selected from a category of items. For example, the top ten (or some other number) popular items of that item category may be selected.

At operation 704, a set of past orders for the plurality of items may be sampled. For example, thousands of past orders of the top ten items may have been received at a network-based resource from a plurality of users. Information about these orders may be maintained at a data store. As such, the data store may be accessed to sample the past orders (e.g., select ten thousand past orders, or some other statistically sufficient number).

At operation 706, recommended items may be identified based on the sampled set. In one example, the information maintained at the data store may also include identifiers of items recommended in connection with the past orders. As such, the recommended items may be identified from the sampled set. In another example, the sampled past orders (e.g., the ten thousand past orders) may be parsed to determine the ordered items. A data store maintaining associations, such as "ordered together" associations, may be accessed to identify items similar to the ordered items. These similar items may represent the recommended items.

At operation 708, a determination may be made as to whether the recommended items include a particular item (e.g., one of the top ten most popular items) or not. For example, identifiers of the recommended items may be compared to an identifier of the particular item. Here again, the number of times the recommended items include the particular item (e.g., occurrence frequency) may be determined and tracked. If the number falls below a threshold, a recommendation issue may exist.

At operation 710, an indication of an issue associated with recommending the particular item may be generated based on the number falling below the threshold. The indication may include information about this number, which may in turn be used as a selective trigger of certain actions of a workflow.

Turning to FIG. 8, the figure illustrates another example flow for determining a recommendation issue. In particular, the example flow may use similarities and inverse similarities accessible from a data store but may not involve exchanging information with a recommendation component.

The example flow may start at operation 802, where a plurality of items may be selected based on associations of these items with a particular item. The particular item may have been selected as an item of interest (e.g., a most popular item of an item category). The associations may be accessed from the data store and may include, "ordered together" associations. In an example, the plurality of items may be selected as items being inversely similar to the particular item.

At operation 804, a plurality of past orders associated with the plurality of items may be accessed. For example, thousands of past orders may have been received at a network-based resource. Information about these orders may be maintained at a data store. As such, the data store may be accessed to retrieve information about the past orders specific to the plurality of items.

At operation 806, recommended items may be identified based on the plurality of past orders. In one example, the information maintained at the data store may also include identifiers of the items recommended in connection with the plurality of past orders. In another example, the plurality of past orders (e.g., the ten thousand past orders) may be parsed to determine the ordered items. Based on the "ordered together" associations, the recommended items may be identified as the items similar to the ordered items.

At operation 808, a determination may be made whether the recommended items include the particular item or not. For example, identifiers of the recommended items may be compared to an identifier of the particular item. The number of times the recommended items include the particular item (e.g., occurrence frequency) may be determined and tracked. If the number falls below a threshold, a recommendation issue may exist.

At operation 810, an indication of an issue associated with recommending the particular item may be generated based on the number falling below the threshold. The indication may include information about this number, which may in turn be used as a selective trigger of certain actions of a workflow.

Turning to FIG. 9, the figure illustrates another example flow for determining a recommendation issue. In particular, the example flow may not use similarities and inverse similarities. Instead, the example flow may involve exchanging information with a recommendation component.

The example flow may start at operation 902, where a plurality of items may be selected. For example, a certain number (e.g., one hundred) of items may be selected from an item category. The selection may be random or may be based on one or more criteria (e.g., the top one hundred popular items). The selected items may include a particular item.

At operation 904, one or more lists of recommended items may be received from a recommendation component based on the selected items. In particular, each of the selected items may be indicated to the recommendation component. In response, the recommendation component may identify recommended items. To illustrate, the one hundred selected items may be indicated to the recommendation component. In turn, identifiers of thousands of recommended items may be returned.

At operation 906, a determination may be made as to whether the one or more lists of recommended items identify the particular item. For example, identifiers of the recommended items may be compared to an identifier of the particular item. The number of times the recommended items include the particular item (e.g., occurrence frequency) may be determined and tracked. If the number falls below a threshold, a recommendation issue may exist.

At operation 908, an indication of an issue associated with recommending the particular item may be generated based on the number falling below the threshold. The indication may include information about this number, which may in turn be used as a selective trigger of certain actions of a workflow.

The example flow of FIG. 9 may be expanded to compare more than two lists of items (e.g., a list of selected items with a list of recommended items). For example, the example flow may similarly be applied to compare a higher number of lists, such as a list of selected items, a list of recommended items, and a list of items ordered by users. The latter list may be generated from information about past ordered received from computing devices of the users, where the information may be maintained at a data store. In this case, an issue associated with recommending the particular item may be identified if the number of times the item is not identified on any of two lists or on collectively all three lists falls below a threshold.

Upon detection of a recommendation issue, a recommendation analyzer may initiate, automatically or based on a user command, an execution of a workflow. The workflow may be configured to identify a potential cause of the recommendation issue. FIG. 10 illustrates an example flow for initiating and executing such a workflow.

The example flow of FIG. 10 may start at operation 1002, where a workflow may be initiated. In an example, the workflow may be initiated based on a detection of a recommendation issue.

At operation 1004, the workflow may be executed to determine a potential cause of the recommendation issue. In an example, the workflow may be configured to check a plurality of potential causes and determine which of these potential causes may have a high likelihood or be the culprit cause behind the recommendation issue. A set of actions specific to each of the potential causes and defined by the workflow may be performed. In an example, a set of actions for one potential cause may be performed in sequence or in parallel to performing a set of action for another potential cause. In another example, the sets of actions may be selectively performed based on a trigger.

Various triggers may be used. For example, when a recommendation issue may have been observed transiently (e.g., occurring at a frequency falling below a threshold, occurring for a short period of time and disappearing after a recommendation analysis may have been replicated), checking an operational status of a computing resource hosting a recommendation component may be performed. In comparison, when a recommendation issue may have been observed for a longer period of time (e.g., occurring at a frequency greater than a threshold) after an item may have been recently added, checking item associations related to that item may be performed.

In an embodiment, the computing resource may be a potential cause. Executing the workflow to check whether the computing resource may actually (or more likely) be the culprit cause may involve determining an operational status of the computing resource. The operational status may be a current status and/or a status around the time the recommendation issue may have been detected. If the operational status indicates a failure of the computing resource, the recommendation analyzer may flag the computing resource as the cause of the recommendation issue. In another example, the recommendation analyzer may replicate the recommendation analysis on another computing resource hosting another instance of the recommendation engine. In this example, if the replicated analysis lacks the recommendation issue, the recommendation analyzer may flag the computing resource as the cause of the recommendation issue.

In an embodiment, one or more filters or settings thereof of the recommendation component may be a potential cause. Executing the workflow to check whether a filter may actually (or more likely) be the culprit cause may involve changing the filter setting of the recommendation component and replicating the recommendation analysis. If the replicated analysis lacks the recommendation issue (e.g., outputted recommendations of the filter based on the changed setting including a particular item that would otherwise result in the recommendation issue), the recommendation analyzer may flag the filter setting as the cause of the recommendation issue.

In an embodiment, a description of an item be a potential cause. In particular, the item may be offered from various sources, such as a service provider or a seller. When offering the item, a portion or all of the description may be provided from the source. In certain situations, the description may include terms that may be black listed (e.g., that would result in an item being filtered out based on a filter of the recommendation component). A black list may include one or more predefined terms that may be deemed to be undesired or unacceptable. For example, a description of a book containing certain derogatory terms may result in not recommending the book. In this case, executing the workflow to check whether the description of the item may actually be the culprit cause may involve comparing terms of the description to terms from the black list to determine a match and accordingly identify the description as the culprit cause.

In an embodiment, insufficient item associations may be a potential cause. Executing the workflow to check whether insufficient item associations may actually (or more likely) be the culprit cause may involve accessing a data store maintaining the associations, retrieving the applicable associations, and performing a statistical analysis to determine if the number of associations may be insufficient. In another example, the analysis may consider the time when offering the item may have started. If that time indicates a recent offering (e.g., being below a certain number of days), insufficient item associations may be assumed.

At operation 1006, a counter associated with a potential cause may be increased based on determining at operation 1004 that the potential cause may actually (or more likely) be the culprit cause behind the recommendation issue. As such, counters of the various potential causes may be updated (e.g., increased) and may indicate how frequency the potential causes may have been identified.

At operation 1008, a particular potential cause may be determined as a hot spot based on a respective counter. For example, the counter of the particular potential exceeding a threshold may indicate that the potential cause may be a repeating offender. Accordingly, the potential cause may be assigned a higher priority (e.g., by initiating a high priority ticked) such that a resolution may be undertaken relatively faster to other identified potential causes. Further, the various counters or comparisons of the various counters to thresholds may be used as triggers of the respective sets of actions of the workflow.

The above described embodiments may be implemented to analyze recommendations.

More specifically, recommendation issues and potential causes may be detected. The various embodiments may be implemented in different environments. An example environment may include a production environment. The production environment may represent an online environment accessible to different users, including sellers and customers, to offer and purchase items. In this example, the recommendation issues and potential causes may be associated with offered items and/or a deployed recommendation component of the production environment. Another example environment may include a test environment. The test environment may represent an offline environment configured to facilitate various types of testing without impacting the production environment, the results of which may be used to improve components of the production environment. In this example, potential recommendation issues and causes may be tested for new items before offering such items in the production environment. Further, updates to the deployed recommendation component or a new recommendation component may be tested prior to a release to the production environment. If the testing results in certain types or frequencies of recommendation issues (e.g., exceeding a predefined threshold or representing a lower recommendation quality than the currently deployed recommendation engine), the potential causes may be further analyzed and troubleshot before the release.

Turning to FIG. 11, that figure illustrates an example end-to-end computing environment for analyzing recommendations for items offered from a network-based resource. In this example, a service provider may implement a recommendation analyzer to analyze recommendations. The items may be listed for offering by a seller 1110 and/or the service provider and may be available for ordering by a customer 1160.

In a basic configuration, the seller 1110 may utilize a seller device 1112 to access local applications, a web service application 1120, a seller account accessible through the web service application 1120, a web site or any other network-based resources via one or more networks 1180. In some aspects, the web service application 1120, the web site, and/or the seller account may be hosted, managed, and/or otherwise provided by one or more computing resources of the service provider, such as by utilizing one or more service provider devices 1130. The seller 1110 may use the local applications and/or the web service application 1120 to interact with the network-based resources of the service provider and perform seller-related transactions. These transactions may include, for example, offering items for sale.

In some examples, the seller device 1112 may be any type of computing devices such as, but not limited to, a mobile phone, a smart phone, a personal digital assistant (PDA), a laptop computer, a thin-client device, a tablet PC, etc. In one illustrative configuration, the seller device 1112 may contain communications connection(s) that allow the seller device 1112 to communicate with a stored database, another computing device or server, seller terminals, and/or other devices on the networks 1180. The seller device 1112 may also include input/output (I/O) device(s) and/or ports, such as for enabling connection with a keyboard, a mouse, a pen, a voice input device, a touch input device, a display, speakers, a printer, etc.

The seller device 1112 may also include at least one or more processing units (or processor device(s)) 1114 and one memory 1116. The processor device(s) 1114 may be implemented as appropriate in hardware, computer-executable instructions, firmware, or combinations thereof. Computer-executable instructions or firmware implementations of the processor device(s) 1114 may include computer-executable or machine-executable instructions written in any suitable programming language to perform the various functions described.

The memory 1116 may store program instructions that are loadable and executable on the processor device(s) 1114, as well as data generated during the execution of these programs. Depending on the configuration and type of seller device 1112, the memory 1116 may be volatile (such as random access memory (RAM)) and/or non-volatile (such as read-only memory (ROM), flash memory, etc.). The seller device 1112 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 1116 may include multiple different types of memory, such as static random access memory (SRAM), dynamic random access memory (DRAM), or ROM.

Turning to the contents of the memory 1116 in more detail, the memory may include an operating system (O/S) 1118 and the one or more application programs or services for implementing the features disclosed herein including the web service application 1120. In some examples, the seller device 1112 may be in communication with the service provider devices 1130 via the networks 1180, or via other network connections. The networks 1180 may include any one or a combination of many different types of networks, such as cable networks, the Internet, wireless networks, cellular networks, and other private and/or public networks. While the illustrated example represents the seller 1110 accessing the web service application 1120 over the networks 1180, the described techniques may equally apply in instances where the seller 1110 interacts with the service provider devices 1130 via the seller device 1112 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 1160 may utilize customer device 1162 to access local applications, a web service application 1170, a customer account accessible through the web service application 1170, a web site, or any other network-based resources via the networks 1180. In some aspects, the web service application 1170, the web site, and/or the user account may be hosted, managed, and/or otherwise provided by the service provider devices 1130 and may be similar to the web service application 1120, the web site accessed by the computing device 1112, and/or the seller account, respectively.

The customer 1160 may use the local applications and/or the web service application 1170 to conduct transactions with the network-based resources of the service provider. These transactions may include, for example, browsing for items, viewing items, ordering items, reviewing items, returning items, and/or other transactions.

In some examples, the customer device 1162 may be configured similarly to the seller device 1112 and may include at least one or more processing units (or processor device(s)) 1164 and one memory 1166. The processor device (s) 1164 may be implemented as appropriate in hardware, computer-executable instructions, firmware, or combinations thereof similarly to the processor device(s) 1114. Likewise, the memory 1166 may also be configured similarly to the memory 1116 and may store program instructions that are loadable and executable on the processor device(s) 1164, as well as data generated during the execution of these programs. For example, the memory 1166 may include an operating system (O/S) 1168 and the one or more application programs or services for implementing the features disclosed herein including the web service application 1170.

As described briefly above, the web service applications 1120 and 1170 may allow the seller 1110 and customer 1160, respectively, to interact with the service provider devices 1130 to conduct transactions involving items. The service provider devices 1130, perhaps arranged in a cluster of servers or as a server farm, may host the web service applications 1120 and 1170. These servers may be configured to host a web site (or combination of web sites) viewable via the computing devices 1112 and 1162. Other server architectures may also be used to host the web service applications 1120 and 1170. The web service applications 1120 and 1170 may be capable of handling requests from many sellers 1110 and customers 1160, respectively, and serving, in response, various interfaces that may be rendered at the computing devices 1112 and 1162 such as, but not limited to, a web site. The web service applications 1120 and 1170 may interact with any type of web site that supports interaction, including social networking sites, electronic retailers, informational sites, blog sites, search engine sites, news and entertainment sites, and so forth. As discussed above, the described techniques may similarly be implemented outside of the web service applications 1120 and 1170, such as with other applications running on the computing devices 1112 and 1162, respectively.

The service provider devices 1130 may, in some examples, provide network-based resources such as, but not limited to, applications for purchase and/or download, web sites, web hosting, client entities, data storage, data access, management, virtualization, etc. The service provider devices 1130 may also be operable to provide web hosting, computer application development, and/or implementation platforms, or combinations of the foregoing to the seller 1110 and customer 1160.

The service provider devices 1130 may be any type of computing device such as, but not limited to, a mobile phone, a smart phone, a personal digital assistant (PDA), a laptop computer, a desktop computer, a server computer, a thin-client device, a tablet PC, etc. The service provider devices 1130 may also contain communications connection (s) that allow service provider devices 1130 to communicate with a stored database, other computing devices or servers, seller terminals, and/or other devices on the network 1180. The service provider devices 1130 may also include input/ output (I/O) device(s) and/or ports, such as for enabling connection with a keyboard, a mouse, a pen, a voice input device, a touch input device, a display, speakers, a printer, etc.

Additionally, in some embodiments, the service provider devices 1130 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 1130 may be in communication with the computing devices 1112 and 1162 via the networks 1180, or via other network connections. The service provider devices 1130 may include one or more servers, perhaps arranged in a cluster, or as individual servers not associated with one another.

In one illustrative configuration, the service provider devices 1130 may include at least one or more processing units (or processor devices(s)) 1132 and one memory 1134. The processor device(s) 1132 may be implemented as appropriate in hardware, computer-executable instructions, firmware, or combinations thereof. Computer-executable instruction or firmware implementations of the processor device(s) 1132 may include computer-executable or machine-executable instructions written in any suitable programming language to perform the various functions described.

The memory 1134 may store program instructions that are loadable and executable on the processor device(s) 1132, as well as data generated during the execution of these programs. Depending on the configuration and type of the service provider devices 1130, the memory 1134 may be volatile (such as random access memory (RAM)) and/or non-volatile (such as read-only memory (ROM), flash memory, etc.). The service provider devices 1130 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1134 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 1134 in more detail, the memory may include an operating system (O/S) 1136, code for an electronic marketplace 1138, data related to an item catalog 1140, code for a recommendation component 1142, data for item associations 1144, and code for a recommendation analyzer 1146. Although FIG. 11 illustrates the various data as stored in the memory 1134, this data or portion of the data may be additionally or alternatively stored at a storage device remotely accessible to the service provider devices 1130.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

selecting, by a computer system associated with an electronic marketplace, an item offered from a web site of the electronic marketplace, the item selected based at least in part on a number of orders for the item exceeding a threshold;

selecting, by the computer system, a plurality of items based at least in part on associations with the item, the plurality of items offered from the electronic marketplace, each association generated based at least in part on a first user order for the item and for one or more items of the plurality of items, the associations stored in a data store and indicating that the item is recommendable for ordering based at least in part on a second user order for any other item of the plurality of items;

providing, by the computer system, identifiers of the plurality of items to a recommendation engine of the web site, the recommendation engine hosted on the computer system;

receiving, from the recommendation engine, a list of recommended items determined based at least in part on the identifiers, the list of recommended items generated by the recommendation engine based at least in part on the associations stored in the data store;

determining, by the computer system, that an identifier of the item is absent from the list of recommended items;

generating, by the computer system, an indication of an issue associated with recommending the item based at least in part on the identifier of the item being absent from the list of recommended items;

determining, by the computer system from potential causes identified in a workflow, that a recommendation filter setting is a potential cause of the issue, the workflow identifying a selection of the potential cause from the potential causes based at least in part on a comparison of a frequency of occurrence of the issue to a frequency threshold, the workflow further identifying an action to be performed to test the potential cause, the action comprising:

updating the recommendation filter setting to a second recommendation filter setting on the recommendation engine based on an application programming interface (API) call,
replicating the list of recommended items by using the second recommendation filter setting on the recommendation engine, and
determining whether the identifier of the item is present in the replicated list of recommended items; and
changing, by the computer system, the recommendation filter setting to the second recommendation filter setting based at least in part on an outcome of performing the action identified in the workflow indicating that the identifier of the item is present in the replicated list of recommended items.

2. The computer-implemented method of claim 1, wherein the indication of the issue is generated based at least in part on a frequency of absence of the identifier of the item in the list of recommended items.

3. The computer-implemented method of claim 1, wherein the item is selected from a category of items based at least in part on determining that the number of orders for the item exceeding the threshold indicates that the item is more popular, provides higher revenue, or is associated with higher rating relative to other items of the category of items.

4. The computer-implemented method of claim 1, wherein providing the identifiers of the plurality of items comprises ranking the plurality of items and sending the ranked plurality of items to the recommendation engine.

5. One or more non-transitory computer-readable media comprising instructions that, when executed with one or more processors, cause a computing system to perform operations comprising at least:
selecting an item offered from a web site of a marketplace based at least in part on past orders for the item;
identifying, from a data store and based at least in part on a recommendation engine of the web site, recommended items offered from the web site of the marketplace, the recommended items recommendable by the recommendation engine based at least in part on a request for information about the item;
determining whether the recommended items comprise the item;
generating an indication of an issue associated with recommending the item based at least in part on whether the recommended items comprise the item;
initiating a workflow to identify a potential cause of the issue based at least in part on the indication of the issue;
determining, from potential causes associated with the workflow, that a filter setting of the recommendation engine is the potential cause of the issue, the workflow indicating a selection of the potential cause from the potential causes based at least in part on a comparison of a frequency of occurrence of the issue to a frequency threshold, the workflow further indicating an action to be performed to test the potential cause, the action comprising:
updating the filter setting to a second filter setting on the recommendation engine based on an application programming interface (API) call,
replicating a list of recommended items by using the second filter setting on the recommendation engine, and
determining whether the item is identified in the list of recommended items; and
changing the filter setting of the recommendation engine based at least in part on an outcome of performing the action.

6. The one or more non-transitory computer-readable media of claim 5, wherein the item is selected from a category of items based at least in part on determining that a number of the past orders exceeds a threshold, and wherein identifying the recommended items comprises:
selecting a plurality of items based at least in part on associations with the item, each association generated based at least in part on a user orders for the item and for one or more items of the plurality of items, the associations indicating that the item is recommendable for ordering based at least in part on a user order for any item of the plurality of items;
indicating the plurality of items to the recommendation engine; and
receiving a list of the recommended items from the recommendation engine based at least in part on the identifying.

7. The one or more non-transitory computer-readable media of claim 5, wherein the marketplace comprises an electronic marketplace configured to offer a plurality of items based at least in part on the web site, and wherein identifying the recommended items comprises:
selecting a plurality of items based at least in part on associations with the item, the associations generated based at least in part on a frequency of viewing in a computing session information about the item and about one or more items of the plurality of items exceeding another threshold and stored in the data store;
indicating the plurality of items to the recommendation engine associated with the electronic marketplace; and
receiving a list of the recommended items from the recommendation engine based at least in part on the identifying.

8. The one or more non-transitory computer-readable media of claim 5, wherein the item is selected from a category of items based at least in part on determining that a number of the past orders exceeds a threshold, and wherein identifying recommended items comprises:
sampling a set of past orders for a plurality of items from the category of items; and
identifying the recommended items based at least in part on past recommendations provided in response to the sampled set.

9. The one or more non-transitory computer-readable media of claim 5, wherein the item is selected from a category of items based at least in part on determining that a number of the past orders exceeds a threshold, wherein identifying the recommended items comprises:
selecting a plurality of items based at least in part on associations with the item, the associations indicating that the item is recommendable for ordering based at least in part on a user order for any item of the plurality of items; and
accessing a plurality of past orders associated with the plurality of items, and
wherein determining whether the recommended items comprise the item comprises:
determining that a plurality of past recommendations generated based at least in part on the plurality of past orders excludes recommending the item at a frequency below another threshold.

10. The one or more non-transitory computer-readable media of claim 5, wherein determining whether the recommended items comprise the item comprises:
- selecting a plurality of items comprising the item;
- receiving one or more lists of recommended items from the recommendation engine based at least in part on identifying the plurality of items to the recommendation engine; and
- determining whether the one or more lists of recommended items identify the item.

11. The one or more non-transitory computer-readable media of claim 5, wherein the item is selected based at least in part on a number of the past orders exceeding a threshold, wherein determining whether the recommended items comprise the item comprises determining a frequency of recommending the item as a part of the recommended items, and wherein the indication of the issue is generated based at least in part on determining that the frequency is below another threshold.

12. The one or more non-transitory computer-readable media of claim 5, wherein the item is selected based at least in part on a number of the past orders being below a threshold, wherein determining whether the recommended items comprise the item comprises determining a frequency of recommending the item as a part of the recommended items, and wherein the indication of the issue is generated based at least in part on determining that the frequency exceeds another threshold.

13. A system comprising:
- one or more processors; and
- one or more computer-readable media comprising instructions that, when executed with the one or more processors, cause the system to at least:
  - select an item offered from a network-based resource based at least in part on determining that a number of past orders for the item exceeds a threshold;
  - identify, from a data store and based at least in part on a recommendation engine of the network-based resource, recommended items offered at the network-based resource, the recommended items recommendable by the recommendation engine based at least in part on a request for information about the item;
  - generate an indication of an issue associated with recommending the item based at least in part on determining that the recommended items exclude the item;
  - initiate a workflow to identify a potential cause of the issue based at least in part on the indication of the issue;
  - determine, from potential causes associated with the workflow, that a filter setting of the recommendation engine is the potential cause of the issue, the workflow indicating a selection of the potential cause from the potential causes based at least in part on a comparison of a frequency of occurrence of the issue to a frequency threshold, the workflow further indicating an action to be performed to test the potential cause, the action comprising:
    - updating the filter setting to a second filter setting on the recommendation engine based on an application programming interface (API) call,
    - replicating a list of recommended items by using the second filter setting on the recommendation engine, and
    - determining whether the item is identified in the list of recommended items; and
  - change the filter setting of the recommendation engine based at least in part on an outcome of performing the action.

14. The system of claim 13, wherein the recommended items are identified based at least in part on the recommendation engine hosted on a computing resource, wherein the workflow is configured to check the potential causes, and wherein an execution of the workflow identifies the computing resource as the potential cause based at least in part on the frequency of occurrence of the issue falling below the frequency threshold.

15. The system of claim 13, wherein the recommended items are identified based at least in part on one or more filters, wherein the workflow is configured to check recommendations received from the one or more filters, and wherein an execution of the workflow identifies a filter having the filter setting as the potential cause based at least in part on respective recommendations of the filter.

16. The system of claim 13, wherein the recommended items are identified based at least in part on a description of the item, wherein the workflow is configured to check the description based at least in part on one or more predefined terms, and wherein an execution of the workflow identifies the description as the potential cause based at least in part on the description comprising a predefined term of one or more predefined terms.

17. The system of claim 13, wherein the recommended items are identified from a plurality of items based at least in part on associations of the plurality of items with the item, and wherein an execution of the workflow identifies the associations as the potential cause.

18. The system of claim 13, wherein the workflow is configured to increase a counter associated with the potential cause based at least in part on the indication of the issue, wherein an execution of the workflow identifies the filter setting as the potential cause based at least in part on the counter exceeding another threshold.

19. The system of claim 13, wherein the workflow is initiated within a test environment to detect whether the potential cause is associated with the recommendation engine.

20. The system of claim 13,
- wherein the filter setting is changed to the second filter setting based on the item being identified in the replicated list.

* * * * *